(12) United States Patent
Round et al.

(10) Patent No.: US 7,178,871 B1
(45) Date of Patent: Feb. 20, 2007

(54) SEATING UNIT

(75) Inventors: Matthew Round, London (GB); Martin Darbyshire, London (GB)

(73) Assignee: British Airways PLC, Middlesex (GB)

( * ) Notice: Subject to any disclaimer, the term of this patent is extended or adjusted under 35 U.S.C. 154(b) by 0 days.

(21) Appl. No.: 09/807,624

(22) PCT Filed: Oct. 15, 1999

(86) PCT No.: PCT/GB99/03445

§ 371 (c)(1),
(2), (4) Date: Oct. 22, 2001

(87) PCT Pub. No.: WO00/21831

PCT Pub. Date: Apr. 20, 2000

(30) Foreign Application Priority Data

Oct. 15, 1998 (GB) ................. 9822545.1
May 24, 1999 (GB) ................. 9912046.1

(51) Int. Cl.
*A47C 7/62* (2006.01)
*A47C 15/00* (2006.01)
*B60N 2/02* (2006.01)

(52) U.S. Cl. ............... 297/244; 297/354.13; 297/217.3
(58) Field of Classification Search ................. 297/245, 297/244, 354.13, 217.13; 244/122 R, 118.6
See application file for complete search history.

(56) References Cited

U.S. PATENT DOCUMENTS

| | | | |
|---|---|---|---|
| 1,702,827 A | | 2/1929 | Gustaveson |
| 2,332,841 A | * | 10/1943 | Burton et al. ............. 244/118.6 |
| 2,480,322 A | * | 8/1949 | Cozzoli ................... 244/118.6 |
| 2,629,425 A | | 2/1953 | James |
| 3,074,759 A | | 1/1963 | Bergenwall |
| 3,784,989 A | * | 1/1974 | LeGrand ........................... 5/9.1 |
| 3,898,704 A | * | 8/1975 | Gallaher et al. ................. 5/2.1 |
| 5,222,780 A | * | 6/1993 | Reh et al. .............. 297/188.19 |
| D340,235 S | * | 10/1993 | Robak et al. .............. D14/373 |
| 5,374,104 A | * | 12/1994 | Moore et al. .......... 297/188.16 |
| 6,007,036 A | * | 12/1999 | Rosen ...................... 248/286.1 |
| 6,059,364 A | * | 5/2000 | Dryburgh et al. ....... 297/354.13 |
| 6,102,476 A | * | 8/2000 | May et al. ................ 297/217.3 |
| 2001/0000639 A1 | * | 5/2001 | Park et al. ................ 297/411.3 |

FOREIGN PATENT DOCUMENTS

| | | |
|---|---|---|
| BE | 562934 A1 | 6/1930 |
| DE | 36 17 709 A | 12/1987 |
| DE | 3617709 A1 | 12/1987 |
| DE | 37 29 836 A | 3/1989 |
| DE | 41 25 958 C | 10/1992 |

(Continued)

*Primary Examiner*—Peter M. Cuomo
*Assistant Examiner*—Sarah B. McPartlin
(74) *Attorney, Agent, or Firm*—Sterne, Kessler, Goldstein & Fox P.L.L.C

(57) ABSTRACT

A seating unit for a vehicle has a pair of seats facing in opposite directions with each seat having a seating space for receiving the seated body of an occupant and an extension space in which the legs of the occupant may be placed. The seats are positioned on each side of a notional dividing axis with the seating space of one extending over the axis at the extension space of the other. The pair of seats is suitable for use in an aircraft cabin with one of the seats facing substantially forward in the cabin and the other of the seats facing substantially aft.

60 Claims, 12 Drawing Sheets

FOREIGN PATENT DOCUMENTS

| | | |
|---|---|---|
| DE | 197 05 754 A | 8/1998 |
| EP | 0 036 822 A | 9/1981 |
| EP | 0 545 691 A | 6/1993 |
| ES | 8206298 A1 | 8/1982 |
| FR | 2 116 446 A | 7/1972 |
| FR | 2 579 434 A | 10/1986 |
| GB | 1346060 A | 2/1974 |
| GB | 2 295 962 A | 6/1996 |
| JP | H3-1837 | 1/1991 |
| JP | H6-13594 | 2/1994 |
| WO | WO 92 06003 A | 4/1992 |
| WO | WO 9618537 A1 | 6/1996 |
| WO | WO 97 39946 A | 10/1997 |
| WO | WO 98 36967 A | 8/1998 |

* cited by examiner

US 7,178,871 B1

SEATING UNIT

This invention relates to a seating unit. More specifically the invention relates to an aircraft seating unit.

In our International patent application (Publication No. WO 96/18537) there is described a seating unit which comprises a primary seat and a secondary unit. The seating unit can be easily manipulated from a "seating configuration" wherein the primary seat functions as a seat to a "bed configuration" wherein the primary seat co-operates with the secondary unit to form a flat sleeping surface. For increased passenger privacy each seating unit is contained within its own fixed housing.

The seats described in WO 96/18537 are currently being used in our first class cabins. The ease of manipulation of each seating unit from a "seat configuration" to a "bed configuration" within a fixed housing, and also the staggered arrangement of the units helps provide a level of comfort and privacy which has set an industry benchmark. In most aircraft the business class cabin is fitted with large reasonably spaced apart seats. However, such seats are not designed to lie flat and do not provide passengers with as much privacy as they would ideally prefer. Despite their success in first class cabins the seating units described in WO 96/18537 are not well suited for use in business class cabins. This is because fitting such seats in a business cabin would mean having to reduce the overall seating capacity of the cabin to an uneconomical level.

It is therefore desirable to provide a seating unit suitable for use in an aircraft cabin, the unit being private and comfortable and making efficient use of the space available in the cabin.

According to the invention there is provided a seating unit for a vehicle the seating unit comprising a pair of seats facing in opposite directions with each seat comprising a seating space for receiving the seated body of an occupant and an extension space in which the legs of an occupant may be placed, the seats being positioned each side of a notional dividing axis with the seating space of one extending over the axis at the extension space of the other.

According to another aspect of the invention there is provided a pair of seats, one for facing forward and the other for facing aft when fitted in an aircraft, each seat defining a major occupancy area and a minor occupancy area extending away from the major occupancy area along a seat axis and comprising a wall to one side of the major occupancy area, the seats being positioned adjacent to each other such that the walls of the seats share a common axis offset with respect to the seat axes to define a major occupancy area in one of the seat which is larger than the minor occupancy area in the other of the seats.

According to another aspect of the invention there is provided a seat for use in an aircraft cabin, the seat comprising a back pan and a seat pan operable together to a plurality of different positions including a take-off position at which the seat pan is inclined to the floor of the cabin to compensate for the take off angle of the aircraft.

According to another aspect of the invention there is provided a secondary unit for use in an aircraft cabin with an aircraft seat, the unit comprising: a pad mounted on an elongate support, the support being of variable height, whereby the elevation of the pad above the cabin floor can be altered.

According to another aspect of the invention there is provided a seating unit for an aircraft cabin, the unit comprising; a seat movable between a retracted position and an extended position; a footrest that is movable into and out of alignment with the seat; and a footrest actuator arranged to move the footrest into alignment with the seat, when the seat is moved towards the extended position.

According to another aspect of the invention there is provided an in-flight entertainment unit comprising: a housing; a monitor supported on the housing by a support arm, the support arm being rotatable about the housing to move the monitor between a stored position and a viewing position and the monitor being rotatable about the support arm to vary a viewing angle when in the viewing position.

According to another aspect of the invention there is provided an in-flight entertainment unit comprising in a self-contained unit which facilitates maintenance of the unit two or more of the following, namely: a monitor; a computer power point; a cocktail table; a condition indicator; or an audio output jack.

The above and further features of the invention are set forth with particularity in the appended claims and together with advantages thereof will become clearer from consideration of the following detailed description of an exemplary embodiment of the invention given with reference to the accompanying drawings.

Figure 1:
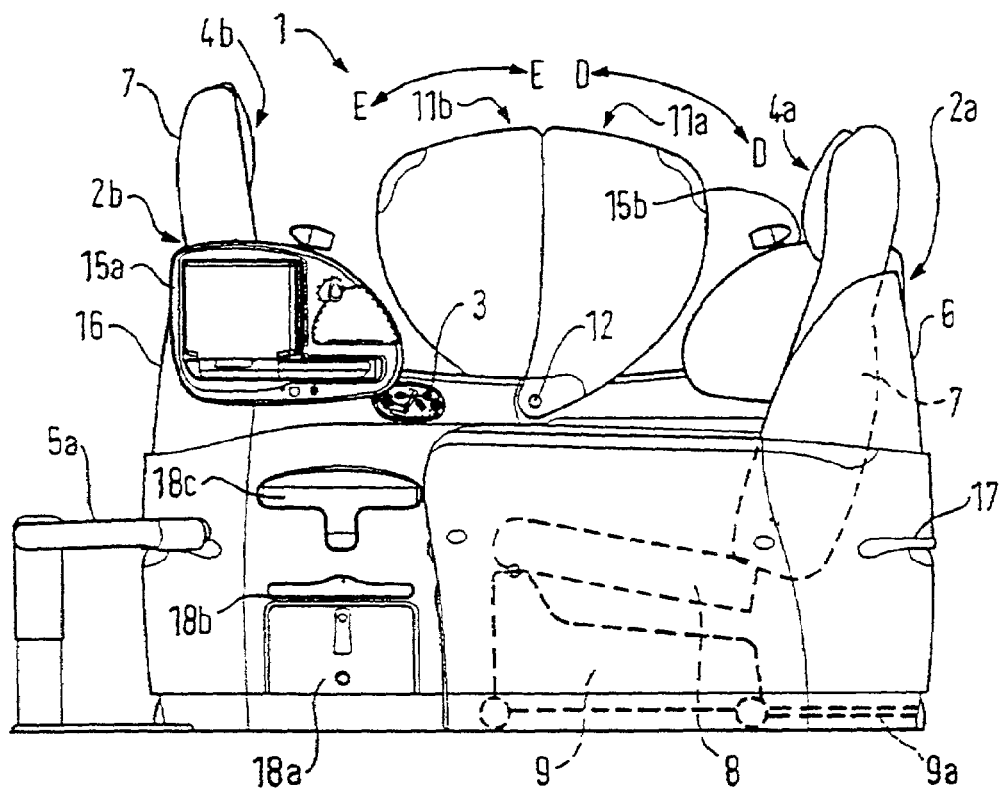
FIG. 1 shows a side view of a pair of seats embodying the invention.
Figure 2:
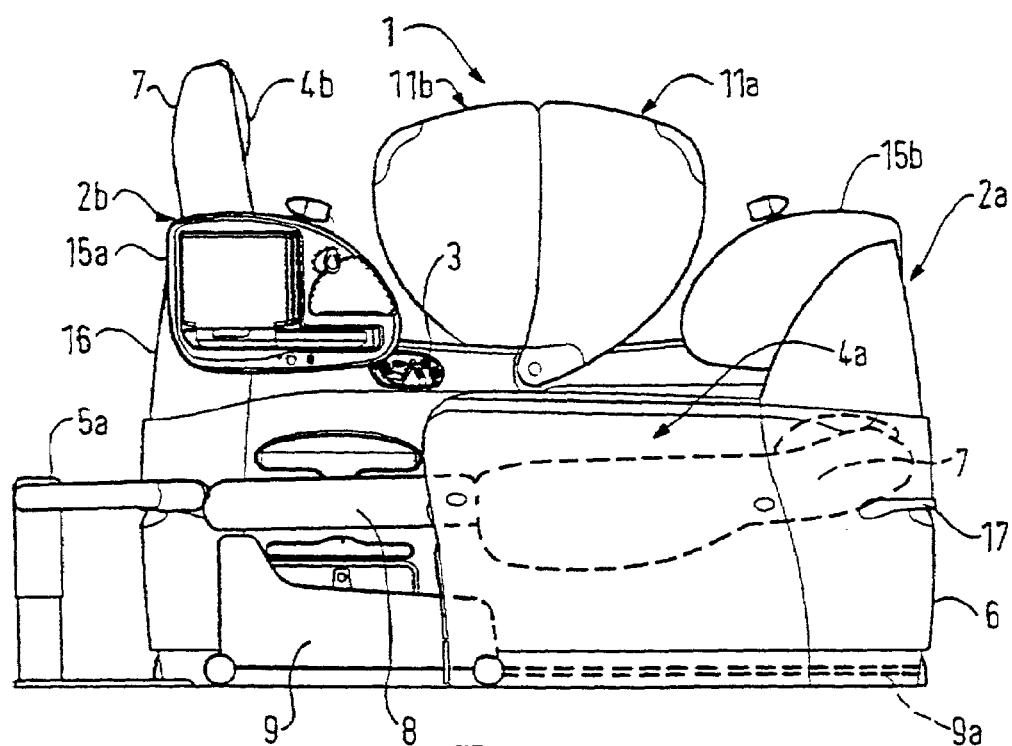
FIG. 2 shows a side view of a pair of seats embodying the invention.
Figure 3:
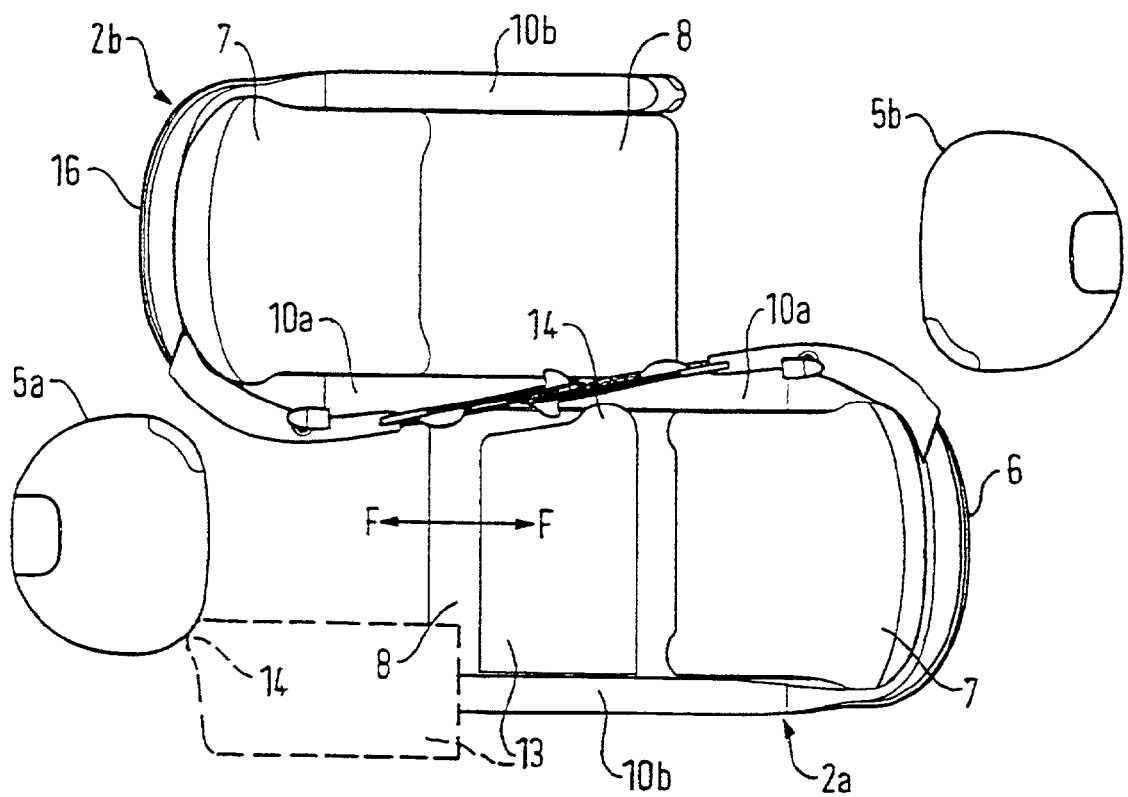
FIG. 3 shows a plan view of a pair of seats embodying the invention.
Figure 5A:
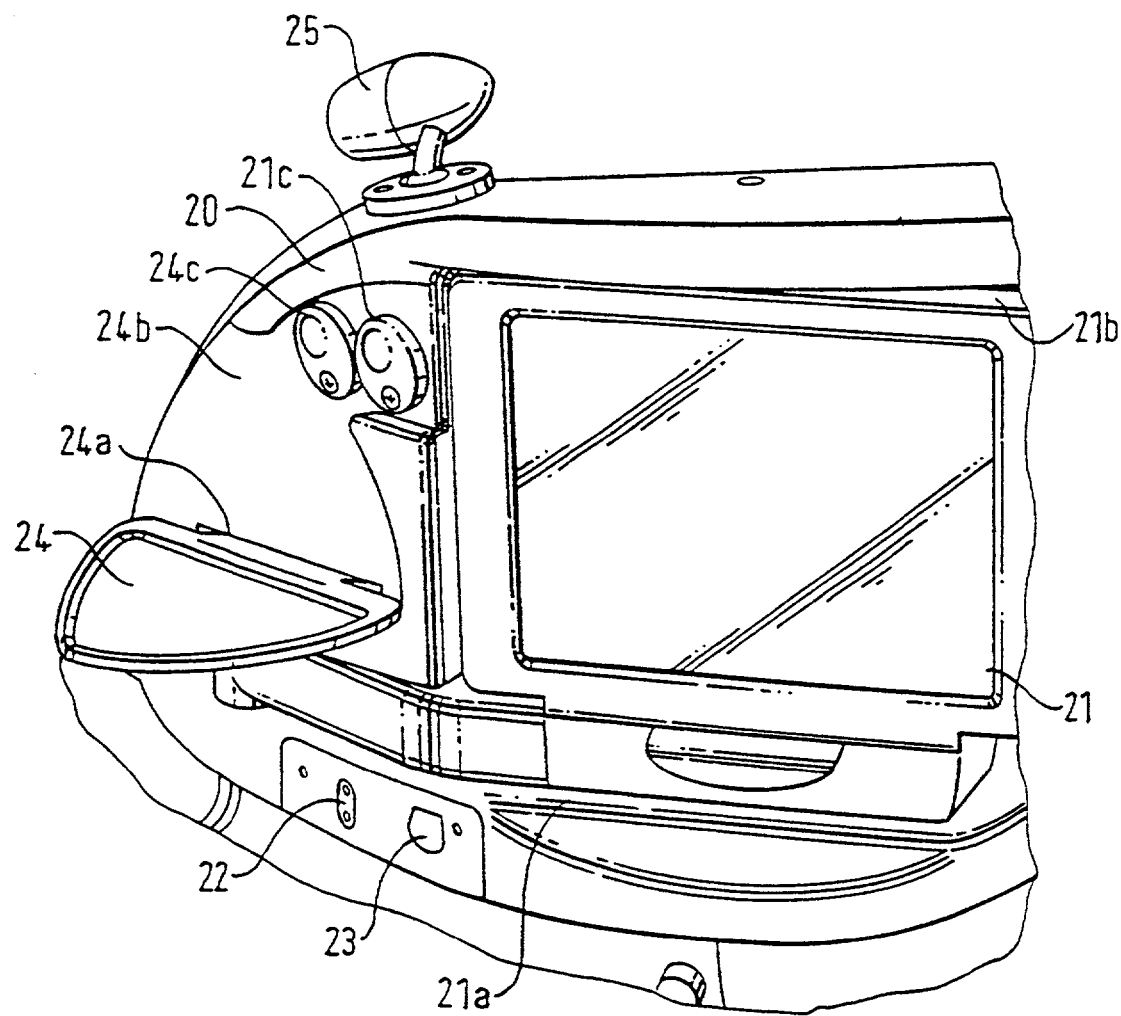
Figure 5B:
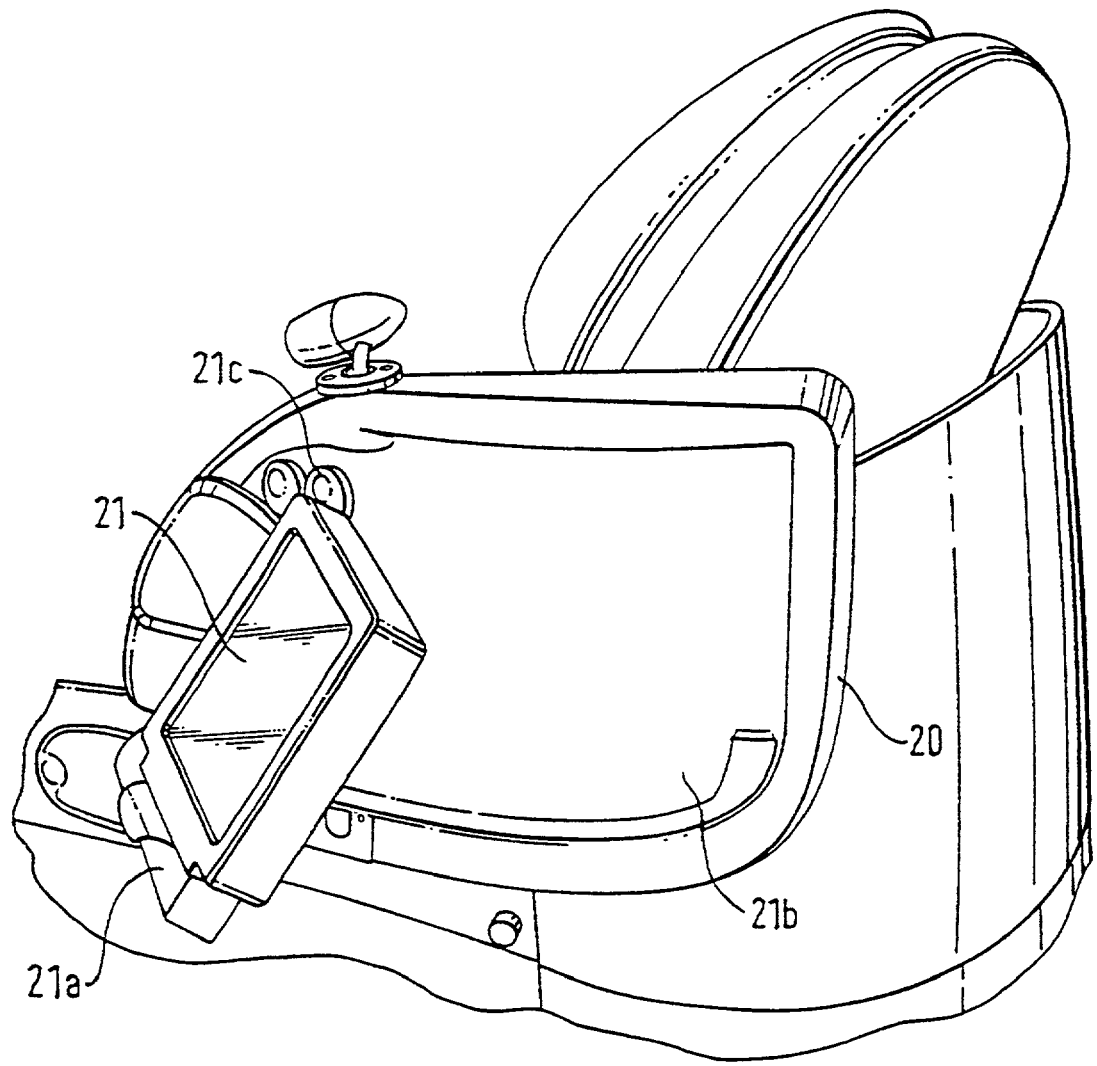
Figure 5C:
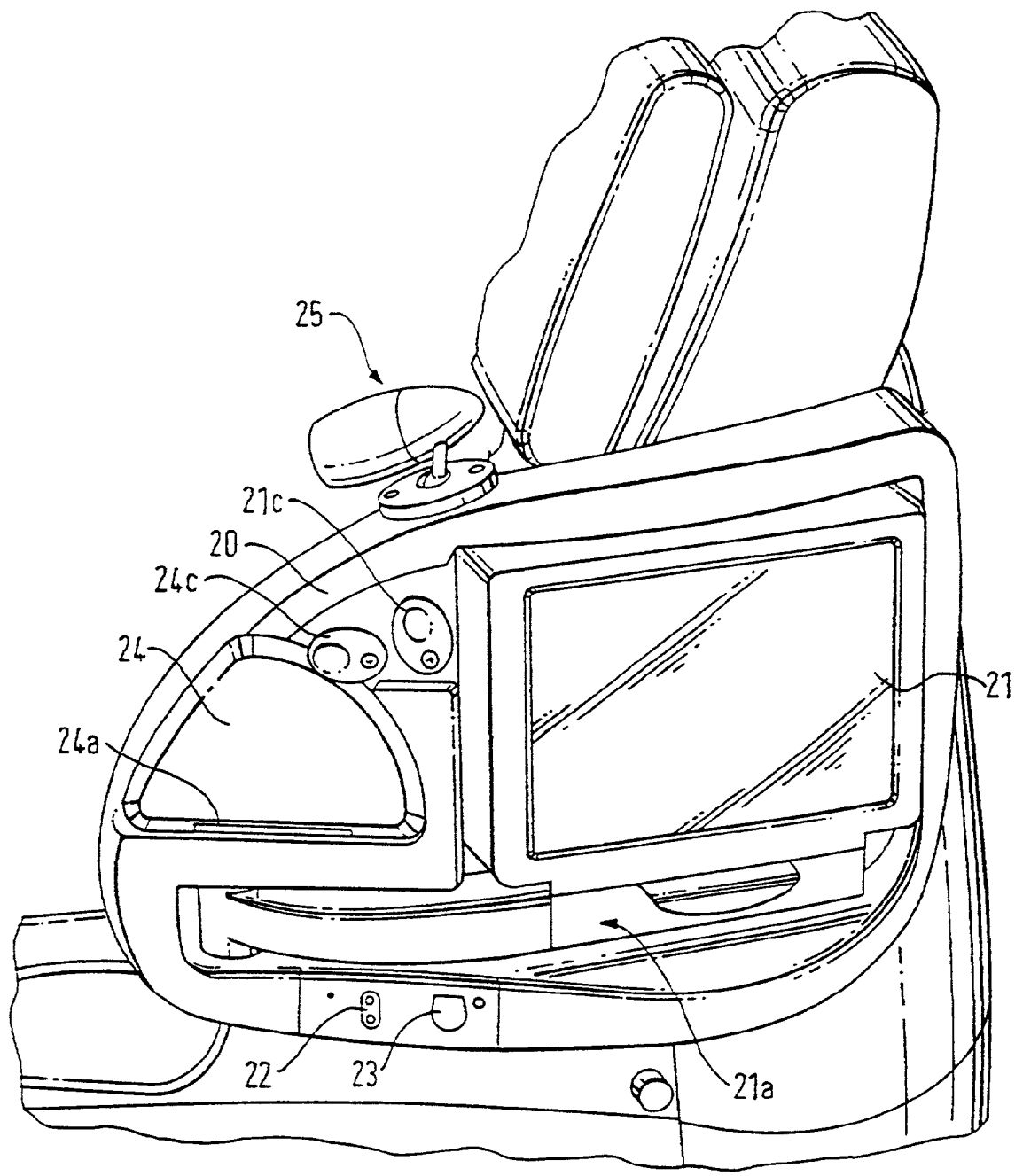
Figure 7A:
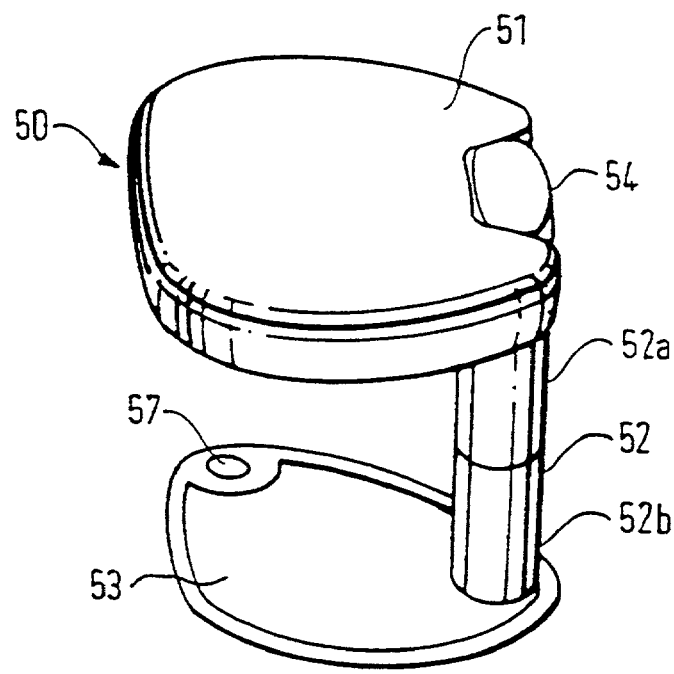
Figure 7B:
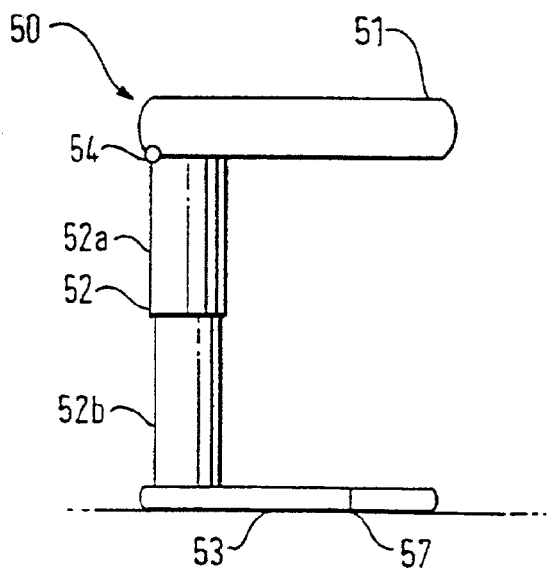
Figure 7C:
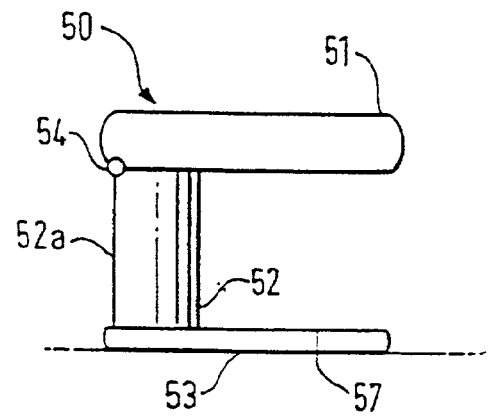
Figure 7D:
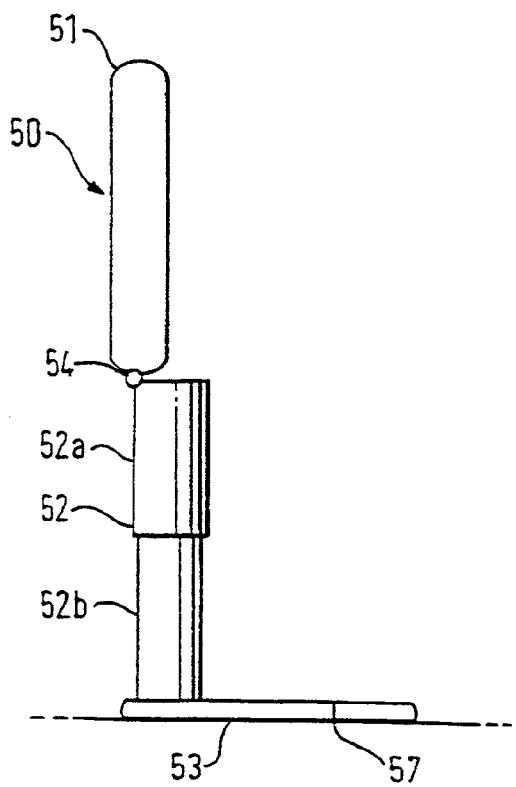
Figure 7E:
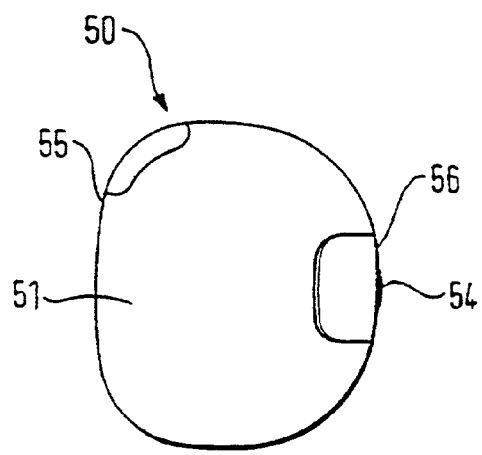
Figure 8:
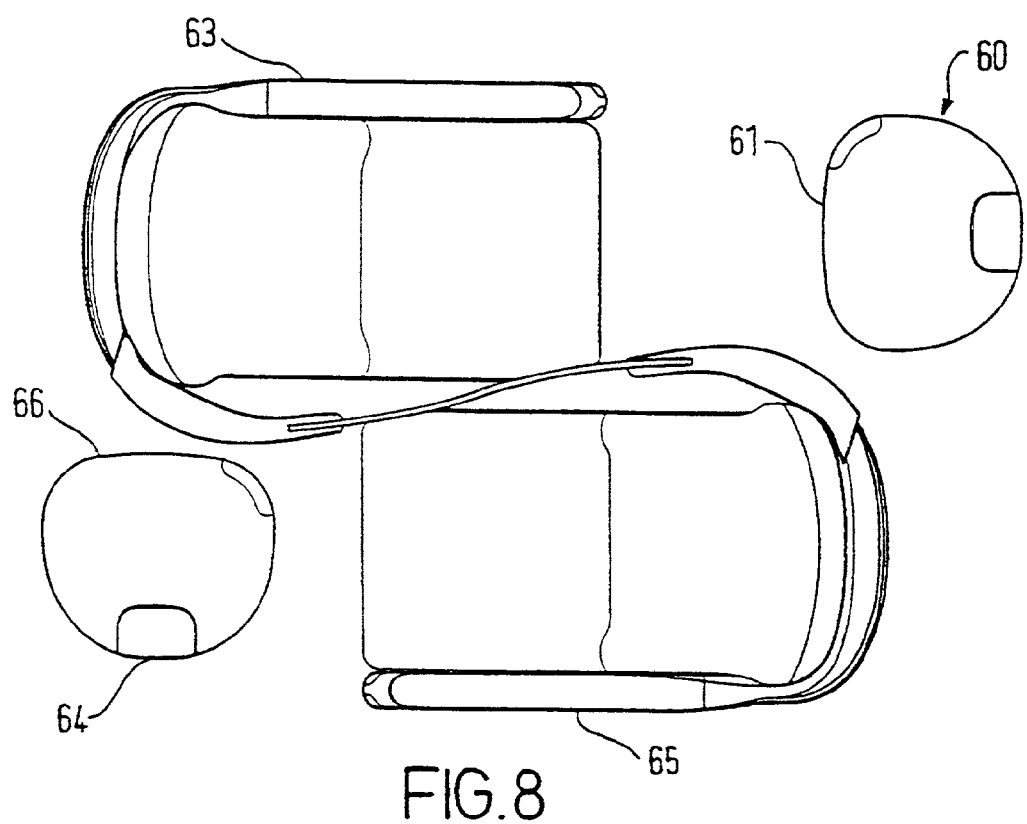
Figure 9:
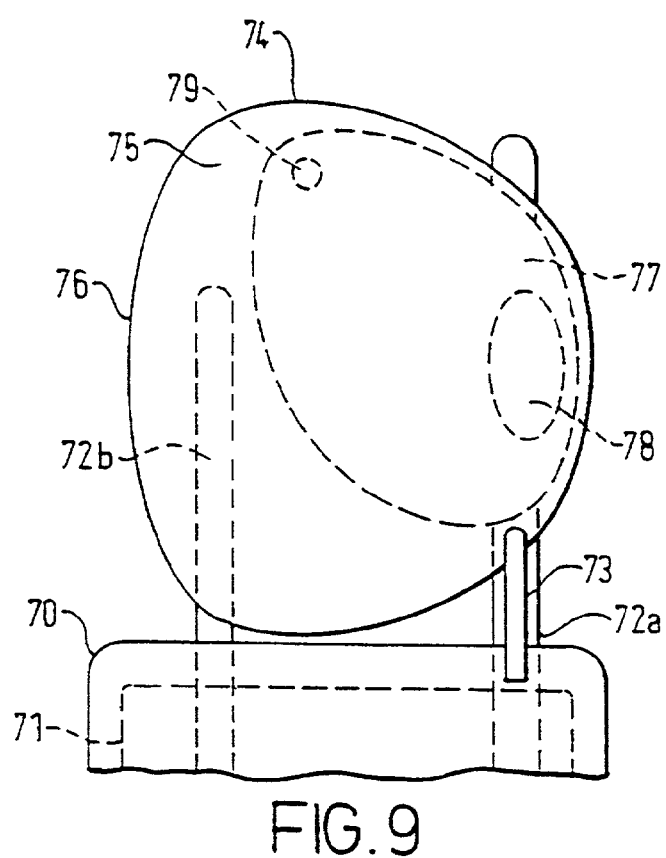
Figure 10:
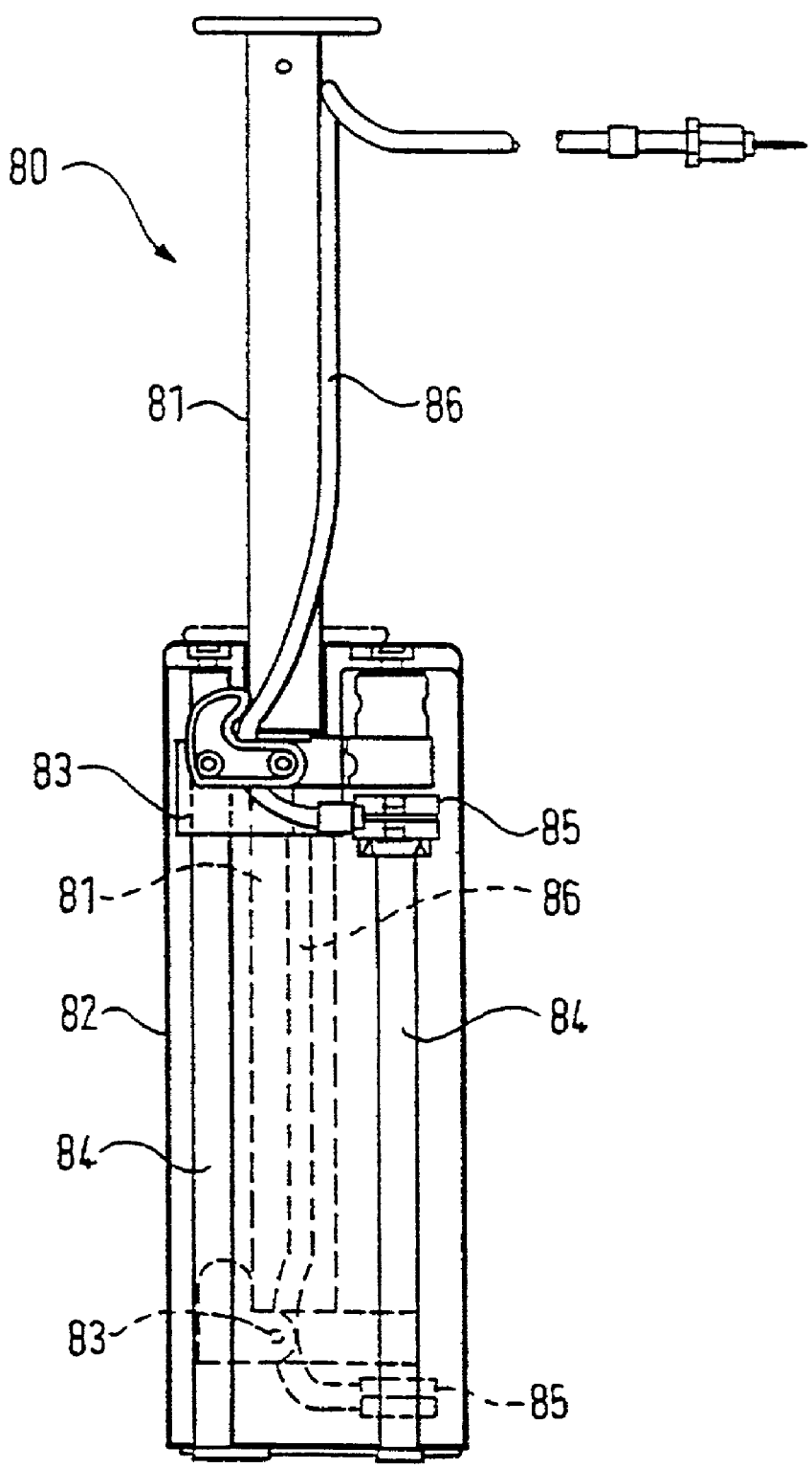
Figure 11:
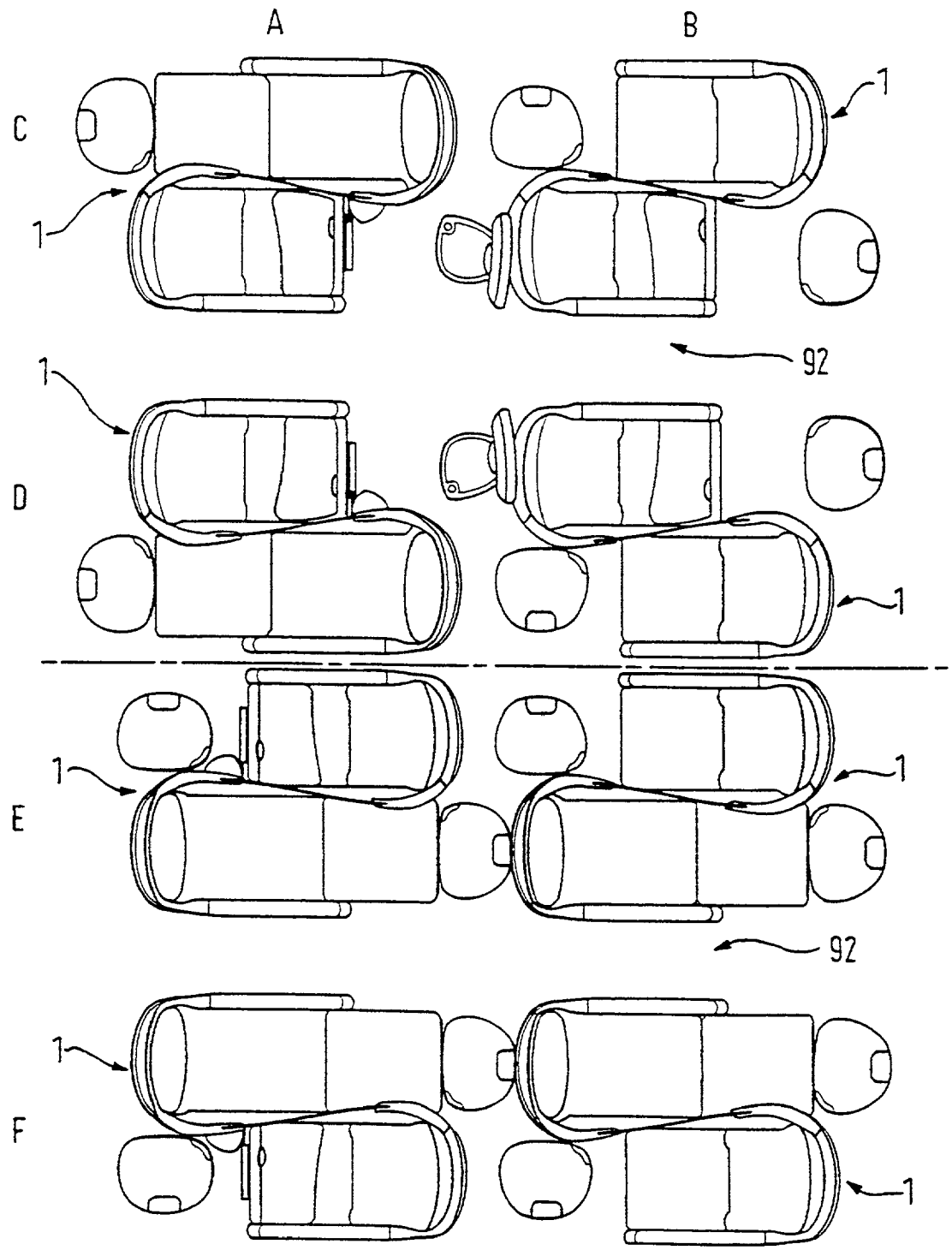

FIGS. 5*a* to 5*c* show an in-flight entertainment unit;

FIGS. 6*a* to 6*e* show a side view pair of a pair of multimode seats;

FIG. 7*a* shows a perspective view of a secondary unit;

FIG. 7*b* shows a secondary unit in an upright configuration;

FIG. 7*c* shows a secondary unit having a pad in a lowered configuration;

FIG. 7*d* shows a secondary unit having a pad in a stored configuration;

FIG. 7*e* shows a plan view of a secondary unit;

FIG. 8 shows a plan view of a pair of seats embodying the invention;

FIG. 9 shows a plan view of a seating portion approaching a misaligned secondary unit;

FIG. 10 shows a side view in partial cut-away of a secondary unit;

FIG. 11 shows an arrangement of seats in an aircraft cabin;

Referring now to FIGS. 1 to 3 of the accompanying drawings there is shown a pair of seating units 1 for an aircraft. The pair of seats 1 is mounted on a pallet to facilitate fitting of the pair in an aircraft cabin. Such pallets are known in the art and therefore need not be described further herein. The pair of seating units 1 are in side-by-side arrangement, with a first seating unit 2*a* for facing towards the front of the aircraft cabin and a second seating unit 2*b* facing towards the rear of the aircraft cabin. Each of the first and second seating units 2*a* and 2*b* comprises a primary reclinable seat 4*a*, 4*b* which faces a secondary unit 5*a*, 5*b*. During a flight, a passenger can recline in comfort on a primary seat 4 whilst resting his or her feet on the corresponding secondary unit 5.

The primary seat 4*a* is contained in a first housing 6, within which the primary seat 4*a* can recline. The primary seat 4b is contained within a second housing 16 within which it can recline. The first housing 6 and the second housing 16 provide privacy between the two primary seats 4a and 4b.

In many respects the two seating units are substantially identical. In order to simplify the following description, reference will be made to the features and operation of a single seating unit except where there are differences between the two.

Each primary seat 4 comprises a back portion 7 pivotally connected to a seating portion 8. The seating portion 8 is supported on the cabin floor by a trolley 9 which is drivable, under the control of a respective control pad 3, by a motor operated screw shaft 9a. Driving of the trolley 9 serves to move the primary seat 4 between an upright position, as shown in FIG. 1, to a bed position, as shown in FIG. 2. In the bed position, the secondary unit 5 together with the seat portion 8 and back portion 7 of the primary seat 4 form a sleeping surface. Also, in this bed position the back portion 7 is supported by a support 17 in the housing. The movement of the seating portion 8 and the back portion 7 between the upright and bed positions is guided by suitable guide tracks (not shown) contained in the housing 6 or 16 at each side of the primary seat 4. Such guide tracks are well known in the art and are described in greater detail in the aforementioned international patent publication WO 96/18537.

Figure 4:
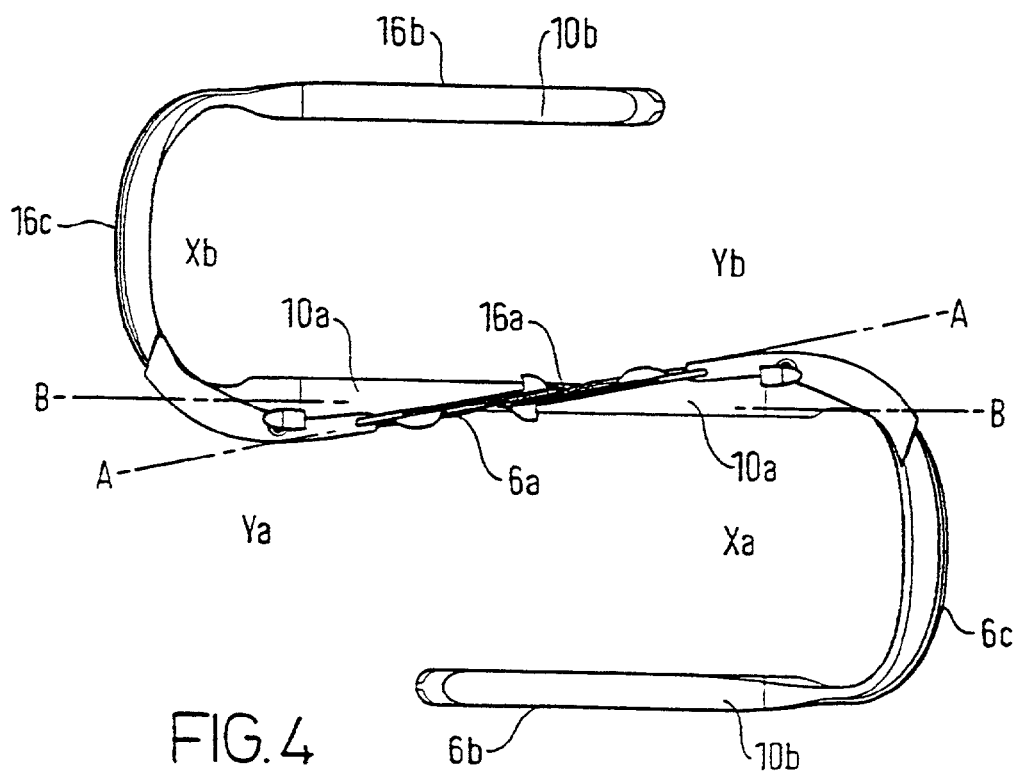
FIG. 4 shows a plan view of a pair of housings for the seats shown in FIGS. 1 to 3.

The first housing 6 and the second housing 16 are most clearly shown in plan view in FIG. 4. For improved clarity the primary seats 4 and secondary units 5 are not shown in FIG. 4. The first housing 6 comprises a first side wall 6a, a second side wall 6b, and a curved back wall 6c which together define a space within which the seating unit 2a (not shown) is contained.

The first side wall 6a, the second side wall 6b and the back wall 6c are preferably separate structures and are assembled together by clipping the back wall 6c to each of the first 6a and second 6b side walls. The second housing 16 is similar in design to the first housing 6 and comprises its own first side wall 16a, second side wall 16b and curved back wall 16c respectively.

In the side-by-side arrangement in which the seating units are placed the first side wall 6a and the first side wall 16a are adjacent to each other. Thus, the first housing 6 and the second housing 16 together form in plan view a distorted S shape. Arm rests 10a and 10b are provided on the first side walls 6a, 16a and second side walls 6b, 16b. This arrangement simplifies the maintenance of components of the seating unit, because access to the components which would otherwise be difficult, can be gained by unclipping and removing a back wall from its housing.

The first side wall 6a of the first housing 6 and the first side wall 16a of the second housing 16 both extend along an axis A—A which axis is offset with respect to the longitudinal axis B—B of the pair of seating units. The second side walls 6b and 16b of the housings 6 and 16 extend along an axis which is substantially parallel to the longitudinal axis of the pair of seating units. The space defined by the housings, 6, 16 are therefore less at the secondary units 5 than at the back walls 6c and 16c. The first housing 6 can therefore be thought of as defining a major occupancy area Xa for the upper part of one occupant and a minor occupancy area Ya for the lower part of the one occupant. Similarly the second housing 16 can be thought of as defining a major occupancy area Xb for the upper part of another occupant and a minor occupancy area Yb for the lower part of the other occupant.

In this configuration, the seating units can be thought of as being positioned each side of a notional dividing line corresponding to the longitudinal axis B—B of the pair of seating units. The housings 6 and 16 are shaped so that the major occupancy area Xa of the first seating unit 2a extends over the dividing line B—B at the minor occupancy area Yb of the second seating unit 2b and so that the major occupancy area Xb of the second seating unit 2b extends over the dividing line B—B at the minor occupancy area Ya of the first seating unit 2a. Thus, extra space is provided where it is needed for the upper body of a passenger and less space, where it is not needed, for the legs. Enough space is made available for each of the seating units to be provided with the arm rests 10a, 10b with the arm rests 10a arranged along a common axis.

Conveniently, each seating unit is also provided with storage space located underneath the primary seat of the adjacent seating unit and accessible via a hatch 18a (see FIG. 1). The storage space may be used to store personal belongings of a passenger, or safety equipment such as a lifejacket. Additional storage space may be provided within each of the trolleys that support a seating portion. A recess 18b and a literature pocket 18c are also provided above the storage hatch 18a.

To provide privacy between the two seating units 2a and 2b the seating unit 2a is provided with a petal or blade-like privacy screen 11a and the seating unit 2b is provided with a corresponding privacy screen 11b (see FIGS. 1 and 2). The privacy screen 11a is pivoted to the first side wall 6a of the housing 6 at a pivot point 12. The privacy screen 11b is similarly pivoted at a pivot point (not shown) to the second housing 16. Each privacy screen 11a, 11b dissects the common axis of the first arm rests 10a and is rotatable about its respective pivot point in a plane defined by the respective first side wall 6a, 16a. The sense of rotation of the privacy screens 11a, 11b is indicated by the arrows D—D and E—E respectively in FIG. 1.

Ideally, each of the privacy screens 11a and 11b is rotatable to block eye-to-eye contact between adjacent passengers when either of the seating units is in any configuration between fully upright and fully reclined positions. Each privacy screen can be fixed in a desired position by a suitable détente mechanism (not shown). Of course, should adjacent passengers wish to converse with each other, then the privacy screens 11a, 11b can be suitably positioned to allow eye contact between the passengers.

Preferably, each of the privacy screens 11a and 11b is composed of a lightweight flexible material so that in the event of an emergency, the screen can be easily rotated out of the way, or if necessary pushed to one side, to allow access to oxygen masks released from overhead compartments. One known material having these properties from which a privacy screen may be constructed is Tufnol®.

As is shown in FIG. 3 of the accompanying drawings, the first seating unit 2a is provided with a one-piece table 13 which is positionable to extend across the seating unit 2a over the lap of a passenger (not shown). The table 13 is stored in a known manner in the arm rest 10b. The table 13 is pivotally mounted to the arm rest 10b of the seating unit 2a by a knuckle joint (not shown). To deploy the table 13 from the stored position the table 13 is first rotated in the plane of the arm 10 out of the storage area and then rotated down over the passenger's lap. When deployed, the joint connecting the table to the arm rest allows the table to be slid perpendicular to the arm 10, in a fore and aft direction (indicated by the arrows F—F) to a position at which the passenger is comfortable. The table 13 can also be rotated in a plane parallel to that of the cabin floor between the position in which the table 13 extends across the seat (shown in full lines), to a position (shown in broken lines) in which the table 13 extends parallel to the axis of the seat. This allows for easy access to and from the seat without a passenger having to return the table 13 to the storage area.

The table 13 includes at one end a fin-shaped projection 14 shaped and positioned to rest on the arm rest 9 of the seating unit 2a when the table 13 extends across the seating unit 2a Preferably, the projection 12a is made of a resilient material so that when the table 13 supports a load, and the projection 14 rests on the arm rest 10a the arm rest 10a is not damaged.

Traditionally, in-flight entertainment devices, such as display screens, headphone points and the like have been mounted to the arm rests of aircraft seats. Accommodating such devices at arm rests has resulted in arm rests that are wider than would be otherwise necessary just to support the arms of an occupant. This is an inefficient use of space. Each of the seating units 2a and 2b is therefore provided with a self-contained in-flight entertainment unit 15a and 15b respectively, each of which is positioned in front of its corresponding primary seat 4 and fixed to the housing of the adjacent seating unit. Such an entertainment unit, is shown in detail in FIGS. 5a to 5c, comprises a housing 20 containing a display monitor 21, headphone points 22, a PC power point 23, a cocktail table 24 and a reading light 25.

The display monitor 21 on which a passenger may watch in-flight movies and the like is pivotally connected to the housing 20 by a support arm 21a. The support 21a is rotatably hinged to the housing 20 and may be rotated to move the display screen 21 from a stored position shown in FIG. 5a, in which the screen 21 fits snugly in a recess 21b in the housing 20, to a deployed position shown in FIG. 5b, in which the screen faces the passenger in the seat. The display screen 21 is itself rotatably mounted to the support arm 21a and can be rotated about the axis of the support arm 21a thereby allowing the passenger to position the screen at a comfortable viewing angle depending on whether the passenger is sitting up or lying down. A rotatable latch 21c is provided to lock the display 21 in the stored position for take off and landing.

The cocktail table 24 is positioned above the support arm 21a to avoid drinks placed on the table 24 being spilt accidentally during adjustment of the position of the display 21. The cocktail table 24 is hinged to the housing 20 by a hinge connection 24a and is movable between a stored position in which the table 24 fits snugly in a recess 24b formed in the housing 20, as is shown in FIG. 5c, and a deployed position in which the table 24 extends from the housing 20, as is shown in FIG. 5a. A rotatable latch 24c is provided to latch the table 24 in the stored position. The headphone 22a and PC power points 23 are suitably positioned to minimize the risk of headphone and PC cables becoming tangled, when such devices are being used.

The reading light 25 is positioned on the top of the housing 20 and is arranged to direct light downwards towards the primary seat of the other seating unit.

Advantageously, access to the rear of an entertainment unit for maintenance or removal of the unit is achieved by unclipping the back portion of the housing of the adjacent seating unit and removing the back portion from its seating unit and the pallet on which the seating unit is placed. After a unit has been repaired or replaced the back portion is clipped back into place.

How a passenger chooses to configure his or her seat during normal flight is entirely up to the passenger and to this end, the primary seat is drivable between any position between upright and fully reclined. Furthermore, each seating unit also has a plurality of predetermined modes associated therewith into which the seating unit is automatically moved by use of a control pad. In each mode, the backrest 4 and the seat portion 8 of a seating unit are fixed at predetermined angles to the vertical and horizontal respectively, horizontal being defined by the plane of the cabin floor. FIGS. 6a to 6e each show the seating unit 2a in a different predetermined seating mode. For reasons of clarity, the trolley supporting the seating portion 8 of the seating unit 2a is not shown.

During take off and landing an aircraft is inclined at about 15° to the horizontal. If the seating units were designed so that the seating portion and the back portion were parallel with and perpendicular to the cabin floor respectfully, a passenger of a rearward facing seat would feel that during take off that he or she were slipping forward out of their seat. This is undesirable, because passengers would understandably find such a sensation uncomfortable.

Figure 6A:
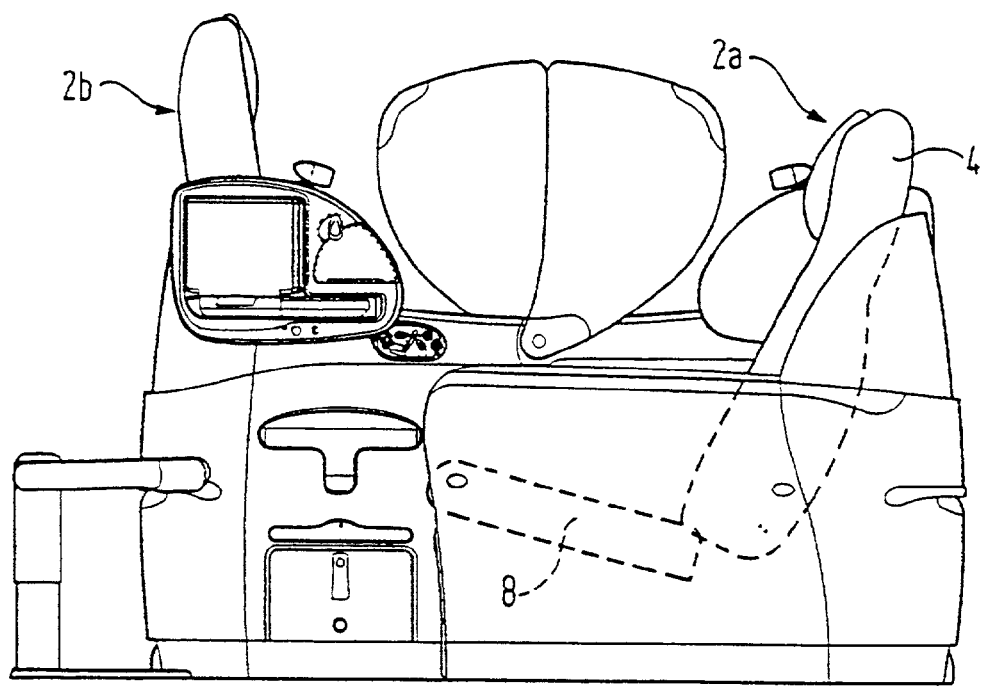

In order to avoid such a problem, one of the modes in which a seating unit can be configured is a taxi, take off and landing (TTOL) mode which is shown in FIG. 6a. In this TTOL mode, which passengers would be required to adopt during taxiing, taking off or landing, the seat portion 8 is inclined at a predetermined angle to the horizontal, and the back portion 4 is inclined at a predetermined angle to the vertical to compensate for the take-off angle of the aircraft and thus leave a passenger feeling comfortable in his or her seat. Studies have shown that passengers find that having the backrest inclined at 30° to the vertical and the seat rest inclined at 15° to the horizontal is particularly comfortable and also acceptable for safety reasons. Preferably, each seat carries solenoid actuated shoot bolts (not shown) which mate with apertures in the seat guide tracks (not shown) to lock the seat in the TTOL position, thereby providing security for the passenger during taxiing, take of and landing.

Figure 6B:
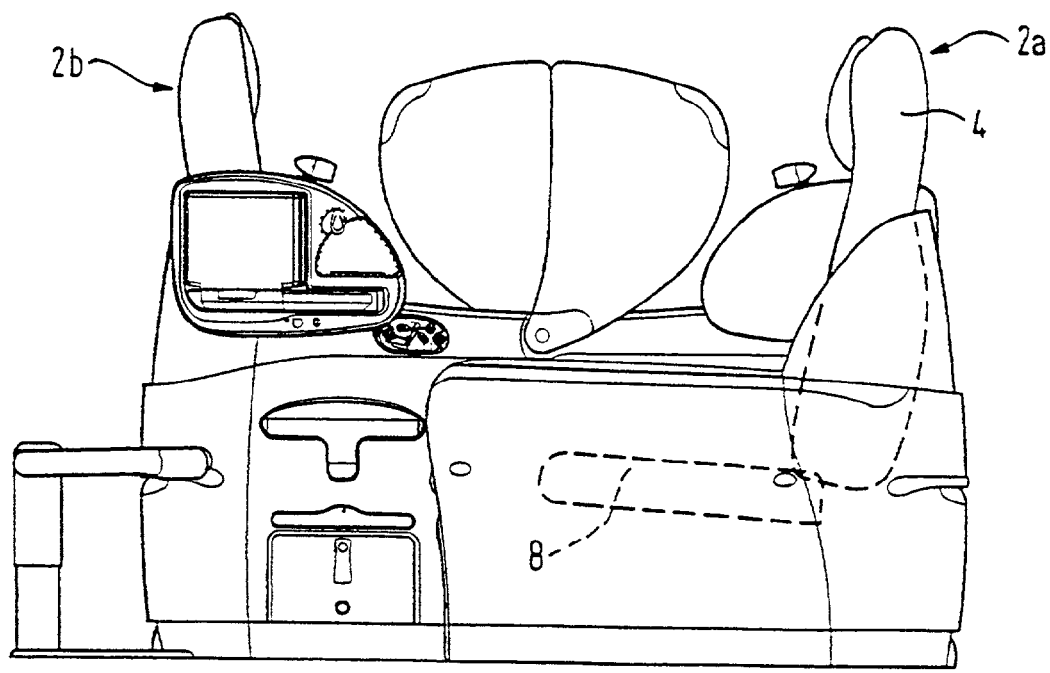

During the course of a flight passengers will spend some time working and some time eating and drinking. One of the predetermined modes that the seats is designed to adopt is a working and eating mode which is shown in FIG. 6b. In the working and eating mode, the back portion 4 is more upright than it is in the TTOL mode, and the seating portion 8 is less inclined to the horizontal than it is in the TTOL mode. This is necessary because passengers would find the orientation of the back and seat portions in the TTOL mode uncomfortable for working or eating in. Preferably, but not essentially, in the working and eating mode the backrest 8 is inclined at about 13° to the horizontal and the seating portion is inclined at about 4° to the horizontal.

Figure 6C:
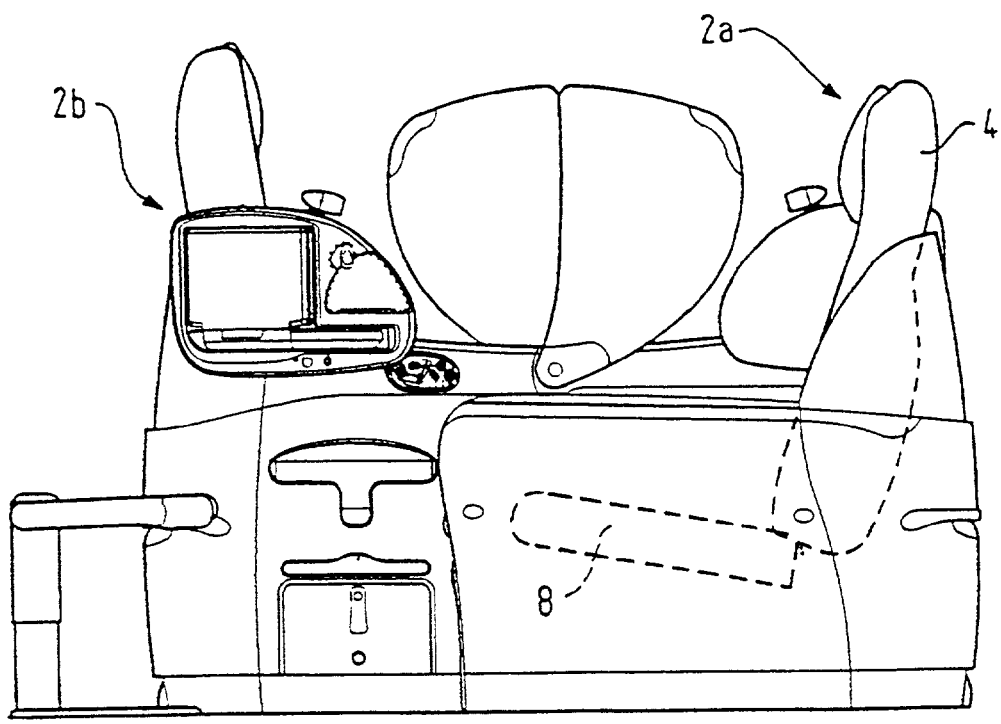

Should passengers find their posture in the working and eating mode uncomfortable, there is also provided a less upright working and eating mode in which the seating unit 2a is shown in FIG. 6c. In this mode, the back portion 8 is preferably inclined at about 20° to the vertical and the seat portion 4 is at inclined about 10° to the horizontal.

Figure 6D:
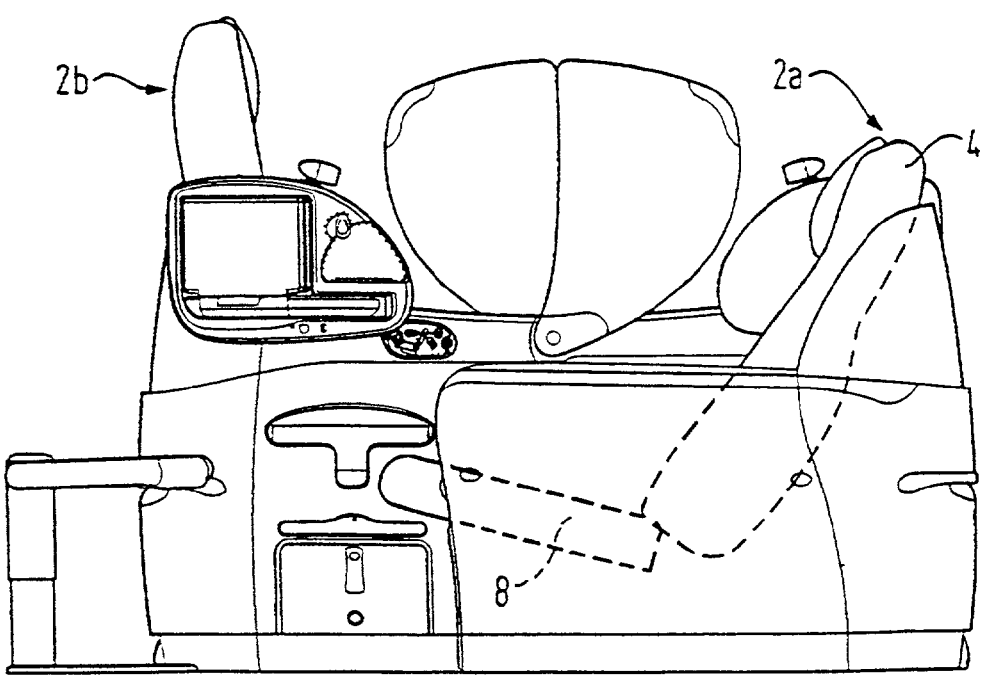

FIG. 6d shows a seating unit 2a in a half reclined mode in which it is envisaged that a passenger can comfortably relax to watch in-flight entertainment on the display monitor or to read. Preferably, in this mode, the back portion is inclined at about 25° to the vertical and the seat portion 8 at about 12° to the horizontal.

Figure 6E:
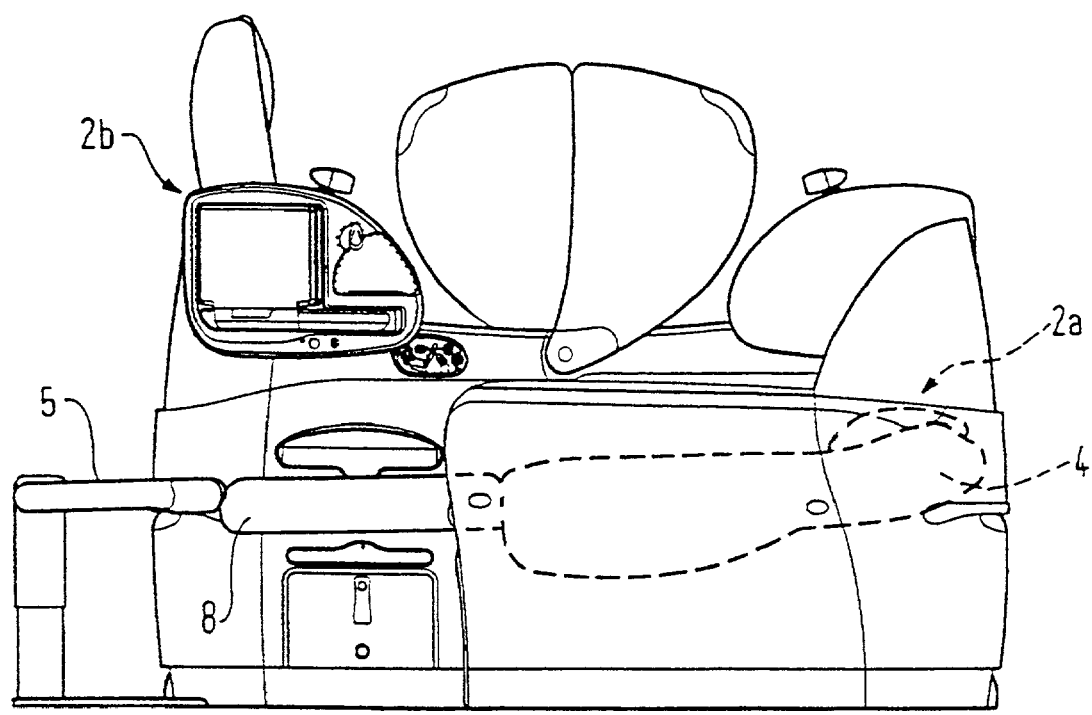

FIG. 6e shows the seat 2a in a bed mode similar to that already shown in FIG. 2a. In this mode, the primary seat 14 and the secondary unit 5 form a substantially flat surface.

FIGS. 7a to 7e of the accompanying drawings depict a secondary unit 50 which is shown in more detail than the secondary unit 5 shown in FIGS. 1 to 3. The secondary unit 50 comprises a pad 51 supported by a support member 52 which is anchored to a base pan 53. The support member 52 comprises a first portion 52a which supports the pad 51 and a second portion 52b on which the first portion 52a is slidably mounted. The second portion 52b is securely attached to the base part 53.

In use, the pad may be raised and lowered to any position between the raised position shown in FIGS. 7a and 7b and the lowered position shown in FIG. 7c. This is achieved by manually sliding the first portion 52a of the support member over the second portion 52b. Preferably, the secondary unit is configured so that if a predetermined minimum excessive force is exerted thereon, for instance three hundred pounds, then the unit is automatically lowered to the lowered position.

When in the upright position, the pad 51 can co-operate with a primary seat to form a flat surface, as is shown in FIG. 2a.

The pad 51 is pivotally connected to the support 52a at a pivot 54. This allows the pad 51 to be pivoted between the horizontal position shown in FIGS. 7b and 7c and the vertical position shown in FIG. 7d. It is envisaged that the pad 51 will be placed into the vertical position for take off and landings and also to allow passenger egress from a seat. In the vertical position, the footpad can be latched, to the back of the housing (not shown) of the next seat in front or to a bulkhead or other fixed structure within the cabin.

FIG. 7e shows a plan view of the pad 51. The pad 51 is angled in shape to allow a passenger to place his or her legs on the cabin floor on each side of the pad. This allows the passenger to leave the seat without necessarily having to flip the pad into the stored position show in FIG. 7d. This is possible because the front edge 55 of the pad 51 is wider than the back edge 56.

Preferably, the base part 53 is pivotally connected to the cabin floor at a pivot point 57. The whole of the secondary unit is rotatable about pivot point 57 for off centre rotation through 90° in the plane of the cabin floor. The rotation of the secondary unit in this plane allows a passenger more easily to change position in a seat during a flight. Full support of the passenger's legs on the secondary unit produces even pressure on the legs which in turn reduces circulation over a period of time. The rotation allows the passenger to avoid such discomfort as a "dead leg" feeling when getting up out of a seat.

Furthermore, this rotation about the point 57 allows the pad to be rotated from a position in which its front edge 51 faces towards the primary seat of the seating unit, to a position where its front edge 51 faces away from the primary seat. This is illustrated in FIG. 8 of the drawings, where the front edge 61 of a secondary unit 60 faces a primary seat 63 and a secondary unit 64 has been rotated or swivelled through 90° so that its front edge 66 faces away from the primary seat 65.

When a primary seat is moved to a fully extended position, in order to form a bed with its secondary unit, it is preferable that the secondary unit is aligned with the primary seat so that the front edge of the unit faces the primary seat. In this configuration maximum support is given to the legs of a passenger. It would be inconvenient for a passenger to have to get up from a primary seat to correctly align the secondary unit each time a seating unit is put into the bed mode. Therefore, preferably each seating unit is arranged so that as the primary seat moves into bed mode, if the secondary unit is not aligned with the primary seat, then, the secondary unit is automatically caused to swivel until the front edge of the unit faces the primary seat. One mechanism for achieving this is shown in FIG. 9 of the accompanying drawings. FIG. 9 shows a plan view of a seat portion 71 approaching a secondary unit 74 which is misaligned with the seat and has a pad 75 with a front edge 76 facing away from the seat.

The seat portion 70 is carried by a trolley 71 which runs in tracks 72a, 72b on the cabin floor. The trolley 71 has a pusher 73 extending therefrom which runs ahead of the trolley in the track 72a. The secondary unit 74 has a base 77 on which the pad 74 is supported by a support 78. The base 77 is pivotably mounted to the cabin floor at a pivot point 79. The base 77 of the secondary unit 74 is shaped so that as the seat portion 70 and the trolley 71 approach the unit 74, if the front edge 76 of the pad 75 is misaligned with the seat portion 70, the pusher 73 contacts the base 77 exerting a force thereon which causes the base 77 to swivel anti-clockwise about the pivot point 79 until, when the seat portion 70 reaches its fully extended position, the secondary unit 74 has been swivelled until its front edge 76 faces the seat portion 70.

Turning now to FIG. 10 of the accompanying drawings, there is shown a partial cut away section of a secondary unit 80 including a mechanism for raising and lowering the secondary unit 80, between a fully upright position and a fully lowered position. The unit 80 comprises a first support 81 in the form of an elongate rod which is slidably mounted in a tube like second support 82. The first support 81 carries at one end a footpad, which for reasons of clarity is not shown, and at the other end is attached to a metal yoke 83. The second support 82 contains a pair of spaced apart upright supporting rods 84 each of which passes through a respective one of a pair of holes (not shown) formed in the yoke 83. The yoke 83 thus bridges the supporting rods 84 and the fit between each rod and hole is loose enough to allow the yoke 84, and thus the first support 81 and the pad, to be slid between the fully raised position (shown in full lines) and the fully lowered position, (shown in broken lines).

The first support 81 and the yoke 83 can be locked at any position between the fully raised and fully lowered positions by means of a "mech lock" 85 attached to the yoke 83. The "mech lock" 85 is operated by an activating handle (not shown) fixed underneath the footpad (not shown), the handle being connected to the "mech lock" 85 via an operating cable 86. Preferably, the lock is configured to release if a force of three hundred pounds or more is applied to the unit. "Mech locks" are well known in the art and will not be discussed any further herein. Preferably, the first support 81 and the cable are surrounded by a protective casing (not shown), which shields the first support 81 and the cable 86 from view and which, as the first support 81 is raised and lowered, slides over the outer surface of the second support 82.

One possible cabin arrangement for the seating units described hereinabove shown in FIG. 11. In this arrangement, pairs of seating units 1 are arranged in rows A, B, extending across the width of the cabin, and plural lines C, D, E, F along the length of the cabin. Each row comprises four pairs of seating units 1 extending across the width of the cabin. In FIG. 9, only two rows A and B of pairs of seating units are illustrated although of course there would be many more rows on an actual aircraft. The first and second pair and the third and fourth pair in each row are separated by aisles 92, which provide access to the seating units and of course, allow passengers and attendants to walk up and down the cabin. Each of the seating units which is adjacent to an aisle faces towards the front of the cabin, whereas the non-aisle seats face towards the rear of the cabin.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

The invention claimed is:

1. An aircraft seating unit, the seating unit comprising a pair of seats facing in opposite directions with each seat comprising a seating space for receiving a seated body of a human occupant and an extension space in which legs of the occupant may be placed, the seats being positioned each side of a longitudinal axis of the seating unit with the seating space of one extending over the longitudinal axis at the extension space of the other; wherein either of said seats has a seat axis substantially parallel to said longitudinal axis and each seat comprises a back portion and a seating portion, said seating portion being movable with said back portion to allow said back portion to move between an upright position that is substantially perpendicular to a floor of an aircraft and a fully reclined position, wherein when said back portion is moved to said fully reclined position, said seating portion and said back portion extend substantially along a horizontal plane such that said seating portion and said back portion together form a substantially flat surface.

2. A seating unit according to claim 1, wherein the pair of seats is arranged so that one of the seats will face substantially forward when fitted in a vehicle and the other of the seats will face substantially aft.

3. A seating unit according to claim 1, wherein each of the seats includes an arm rest, with the arm rest of one of the seats arranged along a common axis with the arm rest of the other seat.

4. A seating unit according to claim 3, wherein the common axis is substantially coincident with the longitudinal axis of the seating unit.

5. A seating unit according to any of claims 1 to 4, wherein the pair of seats are contained within a housing or each seat is contained within a respective housing, the housing or housings bounding the seating spaces and the extension spaces, and forming a wall between the seats, which wall is offset with respect to the longitudinal axis of the seating unit.

6. A seating unit as claimed in claim 5, wherein the seats are positioned adjacent to each other such that the seating space in one of the seats is larger than the extension space in the other of the seats.

7. A seating unit according to any of claims 1 to 4, further comprising a secondary unit in each of the extension spaces, said secondary units being spaced from and positioned to face the respective seats.

8. A seating unit according to claim 7, wherein when said back portion is in said fully reclined position, said seating portion is in a fully extended position, in which together the secondary unit, the seating portion and the back portion form a flat surface.

9. A seating unit as claimed in claim 1, wherein the back portion and seating portion are movable together to a plurality of different positions including a take-off position at which the seating portion is inclined to the floor of the cabin to compensate for the take off angle of the aircraft.

10. A seating unit according to claim 9, wherein the seat is for facing aft when fitted in an aircraft cabin.

11. A seating unit as claimed in claim 9, wherein the seating unit is drivable between a plurality of different positions, including said take-off position in which the seating portion is inclined to the floor of the cabin to compensate for the take-off angle of the aircraft and in which the back portion is partially reclined, the take off position being between a fully reclined mode in which the back portion is fully reclined and a fully upright mode in which the back portion is fully upright.

12. A seating unit according to claim 11, wherein the seating portion is less inclined to the horizontal when the seating unit is in the fully upright mode than when the seating unit is in the take-off position.

13. A seating unit as claimed in claim 9, further comprising latching means for latching the seating unit in the take off position during take-off.

14. A seating unit as claimed in claim 1, further comprising a secondary unit, the secondary unit comprising:
  a pad mounted on an elongate support, the support being of variable height, whereby the elevation of the pad above a floor of the aircraft can be altered.

15. A seating unit according to claim 14, wherein the pad is supported for rotation in a plane substantially parallel to that of the floor of the aircraft.

16. A seating unit according to claim 14, wherein the pad is mounted to the support for pivotable movement about an axis substantially perpendicular to the support between a deployed position and a latched position.

17. A seating unit according to claim 16, wherein the pad in the deployed position is substantially parallel to the aircraft floor and in the latched position is substantially perpendicular to the aircraft floor.

18. A seating unit as claimed in claim 14, wherein the support comprises means arranged to lower the pad when a load in excess of a predetermined maximum is applied to the secondary unit.

19. A seating unit as claimed in claim 14, wherein the secondary unit faces one of the seats.

20. A seating unit as claimed in claim 19, wherein the seat is reclinable to a position in which the seat and secondary unit cooperate to form a flat surface.

21. A seating unit as claimed in claim 19, wherein the seat is movable between a retracted position and an extended position and the secondary unit is movable into and out of alignment with the seat and further comprising a secondary unit actuator arranged to move the secondary unit into alignment with the seat, when the seat is moved towards the extended position.

22. A seating unit according to claim 21, wherein the secondary unit actuator comprises a projection that extends forwardly from the seat which projection contacts the secondary unit when the seat is moved towards the extended position.

23. A seating unit according to claim 22, wherein the seating unit comprises a carriage for moving the seat and where the projection extends forwardly from the carriage.

24. A seating unit according to claim 23, wherein the seating unit comprises tracks mountable to an aircraft floor for the carriage to move along to move the seat, with the projection extending from the carriage along one of the tracks.

25. A seating unit according to claim 21, wherein the secondary unit comprises a base mountable to an aircraft floor for rotation in the plane of the aircraft floor and wherein the secondary unit actuator is arranged to contact the base to rotate the secondary unit into alignment when the seat is moving towards the extended position.

26. A seating unit according to claim 21, wherein the seat comprises a reclinable back portion and a seat portion and when the seat is in the extended position the back portion, seat portion and the secondary unit together form a substantially flat surface.

27. A seating unit as claimed in any one of claims 1 to 4, wherein the seats are each provided with an in-flight entertainment unit comprising:
a housing; and
a monitor supported on the housing by a support arm, the support arm being rotatable about the housing to move the monitor between a stored position and a viewing position and the monitor being rotatable about the support arm to vary a viewing angle when in the viewing position.

28. A seating unit according to claim 27, further comprising a cocktail table mounted on the housing and movable between deployed and undeployed positions.

29. A seating unit according to claim 27, further comprising one or more of a computer power point, an audio output jack and a condition indicator.

30. A seating unit as claimed in claim 27, wherein the entertainment unit for one seat is mounted in a housing associated with the other seat.

31. A seating unit as claimed in any of claims 1 to 4, wherein the back portion and seating portion are movable together to a plurality of different positions including a take-off position at which the seating portion is inclined to a floor of a cabin to compensate for the take-off angle of the aircraft.

32. A seating unit as claimed in claim 31, wherein the seating unit is drivable between a plurality of different positions, including said take-off position in which the seating portion is inclined to the floor of the cabin to compensate for the take-off angle of the aircraft and in which the back portion is partially reclined, the take-off position being between said fully reclined position in which the back portion is fully reclined and a fully upright position in which the back portion is fully upright.

33. A seating unit according to claim 32, wherein the seating portion is less inclined to the horizontal when the seating unit is in the fully upright position than when the seating unit is in the take-off position.

34. A seating unit as claimed in claim 33, further comprising latching means for latching the seating unit in position in the take-off position during take-off.

35. A seating unit as claimed in claim 1, further comprising a secondary unit, the secondary unit comprising:
a pad mounted on an elongate support, the support being of variable height, whereby the elevation of the pad above a floor of the aircraft can be altered.

36. A seating unit according to claim 35, wherein the pad is supported for rotation in a plane substantially parallel to that of a floor of the aircraft.

37. A seating unit according to claim 35, wherein the pad is mounted to the support for pivotable movement about an axis substantially perpendicular to the support between a deployed position and a latched position.

38. A seating unit according to claim 37, wherein the pad in the deployed position is substantially parallel to a aircraft floor and in the latched position is substantially perpendicular to the aircraft floor.

39. A seating unit as claimed in claim 35, wherein the support comprises means arranged to lower the pad when a load in excess of a predetermined maximum is applied to the secondary unit.

40. A seating unit as claimed in claim 35, wherein the secondary unit faces one of the seats.

41. A seating unit as claimed in claim 40, wherein when said back portion is in said fully reclined position, said secondary unit cooperates with said back portion and said seating portion to form said flat surface.

42. A seating unit as claimed in claim 40 or 41, wherein the secondary unit is movable into and out of alignment with the seat and further comprising a secondary unit actuator arranged to move the secondary unit into alignment with the seat, when the seating portion is moved towards said fully reclined position.

43. A seating unit according to claim 42, wherein the secondary unit actuator comprises a projection that extends forwardly from the seat which projection contacts the secondary unit when the seating portion is moved towards said fully reclined position.

44. A seating unit according to claim 43, wherein the seating unit comprises a carriage for moving the seating portion and where the projection extends forwardly from the carriage.

45. A seating unit according to claim 44, wherein the seating unit comprises tracks mountable to an aircraft floor for the carriage to move along to move the seating portion, with the projection extending from the carriage along one of the tracks.

46. A seating unit according to claim 42, wherein the secondary unit comprises a base mountable to an aircraft floor for rotation in the plane of the aircraft floor and wherein the secondary unit actuator is arranged to contact the base to rotate the secondary unit into alignment when the seating portion is moved towards said fully reclined position.

47. An aircraft seating unit, the seating unit comprising a pair of seats facing in opposite directions with each seat comprising a seating space for receiving a seated body of a human occupant and an extension space in which legs of the occupant may be placed, the seats being positioned each side of a longitudinal axis of the seating unit with the seating space of one extending over the longitudinal axis at the extension space of the other; wherein either of said seats has a seat axis substantially parallel to said longitudinal axis and each seat comprises a back portion and a seating portion, said seating portion being movable with said back portion to allow said back portion to move between an upright position and a fully reclined position in which said seating portion and said back portion form a flat surface; and
said seating unit further comprising a secondary unit comprising:
a pad mounted on an elongate support, the support being of variable height, whereby the elevation of the pad above a floor of the aircraft can be altered.

48. A seating unit according to claim 47, wherein the pad is supported for rotation in a plane substantially parallel to that of a floor of the aircraft.

49. A seating unit according to claim 47, wherein the pad is mounted to the support for pivotable movement about an axis substantially perpendicular to the support between a deployed position and a latched position.

50. A seating unit according to claim 49, wherein the pad in the deployed position is substantially parallel to a floor of the aircraft and in the latched position is substantially perpendicular to a floor of the aircraft.

51. A seating unit as claimed in claim 47, wherein the support comprises means arranged to lower the pad when a load in excess of a predetermined maximum is applied to the secondary unit.

52. A seating unit as claimed in claim 47, wherein the secondary unit faces one of the seats.

53. A seating unit as claimed in claim 52, wherein when said back portion is in said fully reclined position, said secondary unit cooperates with said back portion and said seating portion to form said flat surface.

54. A seating unit as claimed in claim 52 or 53, wherein the secondary unit is movable into and out of alignment with the seat and further comprising a secondary unit actuator arranged to move the secondary unit into alignment with the seat, when the seating portion is moved towards said fully reclined position.

55. A seating unit according to claim 54, wherein the secondary unit actuator comprises a projection that extends forwardly from the seat which projection contacts the secondary unit when the seating portion is moved towards said fully reclined position.

56. A seating unit according to claim 55, wherein the seating unit comprises a carriage for moving the seating portion and where the projection extends forwardly from the carriage.

57. A seating unit according to claim 56, wherein the seating unit comprises tracks mountable to an aircraft floor for the carriage to move along to move the seating portion, with the projection extending from the carriage along one of the tracks.

58. A seating unit according to claim 54, wherein the secondary unit comprises a base mountable to an aircraft floor for rotation in the plane of the aircraft floor and wherein the secondary unit actuator is arranged to contact the base to rotate the secondary unit into alignment when the seating portion is moved towards said fully reclined position.

59. An aircraft seating unit, the seating unit comprising a pair of seats directly mounted to a floor of an aircraft cabin and facing in opposite directions with each seat comprising a seating space for receiving a seated body of a human occupant and an extension space in which legs of the occupant may be placed, the seats being positioned each side of a longitudinal axis of the seating unit with the seating space of one extending over the longitudinal axis at the extension space of the other; wherein either of said seats has a seat axis substantially parallel to said longitudinal axis and each seat comprises a back portion and a seating portion, said seating portion being movable with said back portion to allow said back portion to move between an upright position and a fully reclined position, wherein when said back portion is moved to said fully reclined position, said seating portion and said back portion extend substantially along a horizontal plane such that said seating portion and said back portion together form a substantially flat surface.

60. An aircraft seating unit, the seating unit comprising a pair of seats facing in opposite directions with each seat comprising a side wall having a side wall axis, a seating space for receiving a seated body of a human occupant and an extension space in which legs of the occupant may be placed, the seats being positioned each side of a longitudinal axis of the seating unit with the seating space of one extending over the longitudinal axis at the extension space of the other; wherein either of said seats has a seat axis substantially parallel to said longitudinal axis and said side wall axis, and each seat comprises a back portion and a seating portion, said seating portion being movable with said back portion to allow said back portion to move between an upright position and a fully reclined position, wherein when said back portion is moved to said fully reclined position, said seating portion and said back portion extend substantially along a horizontal plane such that said seating portion and said back portion together form a substantially flat surface.

* * * * *